United States Patent
Wong et al.

(10) Patent No.: US 10,585,445 B2
(45) Date of Patent: Mar. 10, 2020

(54) SYSTEMS AND METHODS FOR VOLT/VAR CONTROL IN ELECTRIC POWER MANAGEMENT AND AUTOMATION SYSTEMS

(71) Applicant: Opus One Solutions Energy Corp., Richmond Hill (CA)

(72) Inventors: Joshua Wong, Toronto (CA); Aboelsood Zidan, Waterloo (CA); Mostafa Farouk Shaaban, Kitchener (CA)

(73) Assignee: Opus One Solutions Energy Corporation, Ontario (CA)

( * ) Notice: Subject to any disclaimer, the term of this patent is extended or adjusted under 35 U.S.C. 154(b) by 608 days.

(21) Appl. No.: 14/612,013

(22) Filed: Feb. 2, 2015

(65) Prior Publication Data
US 2016/0224045 A1  Aug. 4, 2016

(51) Int. Cl.
*G05B 15/02* (2006.01)
*G05F 1/66* (2006.01)
*H02J 3/12* (2006.01)
*H02J 3/18* (2006.01)

(52) U.S. Cl.
CPC .............. *G05F 1/66* (2013.01); *G05B 15/02* (2013.01); *H02J 3/12* (2013.01); *H02J 3/18* (2013.01); *Y02E 40/30* (2013.01)

(58) Field of Classification Search
None
See application file for complete search history.

(56) References Cited

U.S. PATENT DOCUMENTS

| | | | | |
|---|---|---|---|---|
| 8,922,175 B2 * | 12/2014 | Krok | ..................... | H02J 3/1828 323/209 |
| 8,972,070 B2 * | 3/2015 | Sun | .................... | G06F 17/30557 700/286 |
| 9,093,840 B2 * | 7/2015 | Sun | .......................... | H02J 3/00 |
| 9,251,479 B2 * | 2/2016 | Sun | ....................... | G06Q 10/06 |
| 9,558,250 B2 * | 1/2017 | Sun | .................. | G06F 17/30557 |
| 9,804,623 B2 * | 10/2017 | Ansari | ...................... | H02J 3/46 |
| 2004/0260430 A1 * | 12/2004 | Mansingh | .............. | G06Q 50/06 700/286 |
| 2009/0187284 A1 * | 7/2009 | Kreiss | .................... | G06Q 50/06 700/291 |
| 2011/0055287 A1 * | 3/2011 | Sun | .................. | G06F 17/30557 707/805 |

(Continued)

*Primary Examiner* — Thomas C Lee
*Assistant Examiner* — Gary Collins
(74) *Attorney, Agent, or Firm* — Kurtz Firm, PLLC

(57) ABSTRACT

A dynamic auto-adaptive volt/VAR control includes a memory storing program code, a communications channel operatively connected to a volt/VAR device, and a processor. The processor is configured to access a database of prior system knowledge and receive real-time measurements and power system operating condition information. The processor processes the prior system knowledge and the real time measurements and operating condition information to create a set of commands for voltage and reactive power control that will result in at least one of: (a) maintaining a voltage profile at the volt/VAR device within predefined limits, or (b) reducing electrical losses through voltage optimization. The processor causes the set of commands to be sent to the volt/VAR device.

16 Claims, 3 Drawing Sheets

(56) References Cited

U.S. PATENT DOCUMENTS

| | | | |
|---|---|---|---|
| 2011/0071690 A1* | 3/2011 | Sun | G06Q 10/06 700/286 |
| 2012/0193984 A1* | 8/2012 | Krok | H02J 3/1807 307/31 |
| 2012/0316689 A1* | 12/2012 | Boardman | H02J 13/0079 700/292 |
| 2013/0024032 A1* | 1/2013 | Vukojevic | H02J 3/1828 700/291 |
| 2013/0030598 A1* | 1/2013 | Milosevic | H02J 3/16 700/298 |
| 2013/0030599 A1* | 1/2013 | Milosevic | H02J 3/14 700/298 |
| 2013/0069437 A1* | 3/2013 | Biallas | H04L 12/413 307/80 |
| 2013/0261823 A1* | 10/2013 | Krok | G05F 5/00 700/291 |
| 2014/0148966 A1* | 5/2014 | Salama | H02J 3/00 700/298 |
| 2015/0112496 A1* | 4/2015 | Fisher | H02J 3/383 700/291 |
| 2016/0285269 A1* | 9/2016 | Majumder | H02J 3/16 |
| 2017/0040839 A1* | 2/2017 | Srivastava | H02J 3/381 |

\* cited by examiner

SYSTEMS AND METHODS FOR VOLT/VAR CONTROL IN ELECTRIC POWER MANAGEMENT AND AUTOMATION SYSTEMS

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present invention relates in general to the field of electric power management and automation systems (EPMAS), including Distribution Management Systems (DMS), Energy Management Systems (EMS), Network Management Systems (NMS) and Distributed Energy Resource Management Systems (DERMS). In particular, the invention relates to systems and methods for volt/VAR control (VVC) functions in such systems. This application also relates to the subject matter of U.S. patent application Ser. No. 14/480,038 filed Sep. 8, 2014, the entire disclosure of which is incorporated herein by reference.

BACKGROUND

Providing voltage to customers within a proper range is one of the electric utility's fundamental tasks. VVC utilizes load/generation forecast, load allocation, a system network model, network topology, market information on energy trades, available real-time measurements/information, etc., to compute and control the desirable settings of system devices that contribute towards voltage profile and reactive power. These volt/VAR devices include voltage regulators, load tap changers, primary and secondary capacitor banks, distribution flexible AC transmission systems (DFACTS), unified power flow controls (UPFC), energy storage systems (ESS), and smart inverters with real and reactive power controls. Optimal settings are sent to the local controllers of VVC elements to be implemented in order to accomplish a set of desired objectives and satisfy a set of defined practical constraints, which are described as follows.

A basic requirement of VVC is to maintain the voltage profile at all load nodes within the acceptable limits under all loading conditions, as defined by standards such as ANSI. ANSI C84.1 standard outlines three voltage levels: low voltage LV (1 kV or less), medium voltage MV (greater than 1 kV and less than 100 kV), and high voltage HV (greater than or equal to 100 kV). Within each voltage level, two ranges of voltage are defined, Range A and Range B, discussed below.

Utilities are usually mandated to design and operate their system such that the service voltage is within a standard range. This is defined as Range A, and is utilized for normal operating conditions. A second range, Range B, is used for abnormal operating conditions. Range B is a relaxed limit that depends on extent, frequency, and duration. However, when the electrical system experiences voltage conditions in this range, corrective actions must commence within a reasonable time to bring voltage level back within Range A. For low voltage level in distribution systems, ANSI C84.1 provides boundary limits of −5% and +5% for Range A and −8.3% and +5.8% for Range B. However, in medium voltage level, ANSI C84.1 provides boundary limits of −2.5 to +5% for Range A, and −5 to +5.8% for Range B.

Another objective of VVC is improving system efficiency and minimizing losses through voltage optimization.

A further objective of VVC is reducing electrical demand through conservation voltage reduction (CVR).

Other objectives of VVC are: power factor correction, enabling high penetration of distributed generation (DG) and renewable resources, enabling islanded microgrids, satisfying distribution feeder capacity limits, and satisfying limits on VVC device operations due to limit of their energy capacity, life expectancy, and maintenance costs.

Modern electric power systems (EPS) are faced with a high degree of complexity and uncertainty due rising factors such as aging and constrained infrastructure, penetration of distributed generation (DG), new loads (e.g. electric vehicles (EVs)), and rise of energy storage devices. These factors may cause uncertain voltage profiling on feeders. As a result, conventional VVC strategies are becoming inadequate to satisfy the voltage regulation and optimal system performance in terms of real-time adaptability with dynamic system operating conditions and topologies.

Electrical power systems are furthermore hierarchical structures with generation and bulk power operations at the top, a transmission system as the next tier, a distribution system as the next, etc. Furthermore, large distribution systems may include microgrids and non-microgrid branches. A microgrid typically includes localized groupings of loads, generation sources, and storage devices that are connected to a traditional centralized grid, or macrogrid.

Centralized control approaches for these large systems can be prohibitively complex and cumbersome to perform wide area-optimized control. Such systems tend to apply centralized control approaches based on simple one-way communications to devices and heuristic rules, and not coordinated amongst all tiers of the EPS. Alternatively, local control approaches will be far from optimal because there is no explicit centralized coordination among different controllers/devices at the system level. From another perspective, VVC is but one application of an EPMAS. The infrastructure and resources required for implementing VVC should be leveraged to provide other functionalities, such as microgrid controls, optimal feeder configurations, and distributed energy resource (DER) management.

Optimizing an EPS across tiers and EPMAS functionalities can be a formidable task, particularly when network conditions change. Traditionally, volt/VAR devices such as voltage regulators and switched capacitor banks are operated as independent devices, with no direct coordination between the individual controllers. Such an approach might be effective for maintaining acceptable voltage and reactive power flow near the controllers, but typically does not produce optimal results for the entire system.

Distribution feeders typically work in radial or open loop topologies. Therefore, distribution systems may experience issues with undervoltage due to high loading on their longer feeders. Appropriate voltage regulation has great importance for improving voltage profile, reducing system losses, and increasing system efficiency.

Conventional distribution systems and their control strategies such as protection coordination, volt/VAR control (VVC), and fault detection, have been designed based on unidirectional power flow, i.e., the substation is the only source of power. However, the insertion of DG units into distribution systems renders this assumption invalid. As a result, several challenges related to system operations such as voltage profile, protection coordination, voltage flicker due to variable output power from renewable resources; reverse power flow, fault detection, and service restoration have been raised.

Four control devices are typically used to control voltage and reactive power flow in distribution systems: Load Tap Changer (LTC), Substation Capacitor (SC), Step Voltage Regulator (SVR) and Feeder Switched Capacitor (FSC).

FIG. 1 illustrates the four typical volt/VAR control devices in distribution systems. In FIG. 1, 101 indicates a Distribution system substation and 102 indicates a load tap changer (LTC) which is connected at the main substation transformer to keep the secondary voltage close to a specified value at different loading conditions. 103 indicates a medium voltage (MV) busbar. 104 indicates a MV to low voltage (LV) transformer. 105 indicates distribution system load points. 106 indicates a substation capacitor (SC) which connects to the secondary bus of the substation to regulate the reactive power flow through the main transformer in order to keep the system operating at acceptable power factor (pf). 107 indicates a feeder switched capacitor (FSC) which connects at different locations on feeders, to provide voltage regulation and reactive power compensation in order to improve the voltage profile along the feeder. 108 indicates a step voltage regulator (SVR) which connects at different locations on feeders, to provide voltage regulation to improve the voltage profile along the feeder.

Previously, the VVC could be implemented using different approaches, such as local VVC, remote VVC, and Distribution-model-based VVC. Each of these approaches is discussed in more detail below.

Local VVC

Local, or standalone, VVC is based on locally available information. Control set-point adjustments for VVC devices are very infrequent and can be implemented on a seasonal basis. In local VVC, each device receives local information from the system, and then through local decision processes selects a control action to implement.

Usually, the LTC and voltage regulators are controlled with line drop compensation (LDC). LDC estimates the line voltage drop ($\Delta V$) and performs voltage corrections based on feeder current ($I_{comp}$), voltage ($V_{reg}$), and system equivalent parameters ($R_{set}$, $X_{set}$).

On the other hand, capacitor banks can be controlled by different modes of local controls, such as the following:

a. Power factor: closes the capacitor bank when the lagging power factor is less than a defined threshold, and begins timing to open the capacitor bank when the leading power factor is less than a defined threshold. In general, power factor control is not recommended. This is because if the power factor at light load is low, this would not be an appropriate time to switch a shunt capacitor in. Also, if the power factor during heavy load is high and the capacitor bank does not operate, the potential benefit of the capacitor bank will not be realized.

b. Current: closes the capacitor bank when the phase current is greater than the high current threshold and begins timing to open the capacitor bank when the phase current is less than the low-current threshold. Current control works well if the power factor of the load is fairly constant.

c. Voltage: closes the capacitor bank when the bus voltage is outside of the thresholds and begins timing to open the capacitor bank when the bus voltage greater than a defined voltage inhibit threshold. Voltage controlled FSC are most appropriate when the main role of capacitors is voltage regulation.

d. Reactive power: energize capacitors banks when lagging kVAR reactive power flow exceeds a set-point, and de-energize when leading kVAR reactive power flow exceeds high leading kVAR threshold. To minimize the reactive power flow, reactive power controlled capacitors are most appropriate.

e. Time-based: configure the time of day to close and open the capacitor bank. Thus, shunt capacitors are switched in and out at a pre-determined time of day. This type of control can be applied if the load characteristics are predictable and consistent over long periods of time. However, this control strategy can become inefficient when the load profile changes daily or seasonally or if variable distributed generation is involved.

f. Temperature: has a similar characteristic to time control except that capacitor bank switching is triggered by ambient temperature. This control type is suitable where loading has a strong correlation with temperature.

The strengths and weaknesses of local VVC can be summarized as follows. The strengths are that it provides a low-cost, modular self-contained system requiring minimal operator involvement and does not rely on field communications. The weaknesses are that it lacks coordination among volt/VAR devices, with potential conflicting controls and operations; system operation may not be optimal under different conditions; it lacks visibility beyond local conditions; it lacks flexibility and adaptability to respond to changing conditions such as load and generation levels; it does not handle high penetrations of distributed generation (DG) effectively; and it typically cannot override its set operation during emergencies.

Remote VVC

In remote control, VVC devices are monitored and controlled by the utility's Supervisory Control and Data Acquisition (SCADA) system. Local LTC and SVR controllers change their tapping and SC and FSC controllers open and close their switches based only on commands from the SCADA system. Control decisions are based on predefined system rules or heuristics. An adjustable SCADA heartbeat time ensures that communications remain active. The operation of these systems is primarily based on a stored set of predetermined rules.

Remote VVC is typically handled by two independent processes, VAR dispatch and volt control. VAR dispatch controls capacitor banks to improve power factor and reduce electrical losses. Volt Control controls LTCs and/or SVRs to keep consumer voltage magnitudes within standards.

The strengths and weaknesses of remote VVC can be summarized as follows. Its strengths are that it provides remote measurements with predetermined rules; operations can be overridden during emergencies; it has better scalability and coordination over local (standalone) control; and it has potential efficiency improvements over local control. Its weaknesses are that it is typically more expensive and has greater complexity with communication infrastructure; operation of VAR and volt devices are usually not coordinated (separate rules for VAR dispatch and volt Control); system operation may not be optimal under different conditions; it lacks flexibility and adaptability to respond to changing conditions such as load and generation levels (rules are fixed in advance); it cannot handle high penetrations of DG effectively; and it typically requires greater operator involvement and training.

Distribution Model-Based VVC

This control scheme aims to achieve better performance by utilizing the "as operated" distribution engineering model to solve the problem of volt/VAR as an optimization problem. This is typically run for 24 hours of the day before the dispatch day ("day-ahead planning") utilizing day-ahead load/generation forecast. Therefore, it develops and executes a coordinated optimal operating schedule for all VVC devices to achieve utility-specified objectives. The LTC, SVR, SC and FSC are remotely dispatched every hour, by using an automated schedule, which is defined based on day-ahead load/generation forecast.

An objective of the volt/VAR optimization problem is to minimize system losses, while keeping consumer voltage magnitudes within standards and limiting the number of LTC, SVR and capacitor banks switching operations. Solving this optimization problem is not a trivial task because of the load variation, the discrete nature of the LTC, SVR and capacitor bank switching and nonlinear power flow equations.

The strengths and weaknesses of distribution model based VVC can be summarized as follows. The strengths are that it provides a coordinated system of VVC devices; it can provide an optimal solution based on day-ahead load forecasting; it provides flexible operating objectives accommodating various needs; it is able to handle complex feeder arrangements; it can model the effects of DG and other modern grid elements such as active inverter controls and electric vehicles; it is highly scalable; and the system can assist the operator with training and automated operations. Its weaknesses are that its complexity leads to a lack of field proven products except in centralized distribution management systems; it has a higher cost to implement, operate and sustain; due to load variations, while VVC settings are optimum during their dispatching times, there is no guarantee that they will continue to be optimal until the next scheduled dispatch; it does not typically have the capability to adapt automatically to load changes that deviate from forecast.

Inappropriate voltage regulation can cause many problems for customers. These include unsafe and inefficient operation of electronic devices, tripping of sensitive loads, overheating of induction motors (IMs), and equipment failures that lead to higher no-load losses in transformers. Additionally, inappropriate control of reactive power flow can increase the total system losses.

For example, the continuous increase of renewable DG penetration changes the characteristics of distribution systems from being passive with unidirectional power flow to active with bidirectional power flow. These DGs are usually not utility owned and are intermittent energy sources such as wind and solar based DG units. When DGs are connected to a distribution system, they alter the voltage profile and interfere with the conventional VVC strategies of LTCB, SVRs and capacitor banks. Consequently, overvoltage, undervoltage, increased system losses and excessive wear and tear of VVC devices may occur. In addition, load variations are becoming more adverse, with EVs on the rise and changes in usage by end-use customers through demand response programs. High R/X ratio for distribution lines limits the voltage correcting abilities of VAR-only devices.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Figure 1:
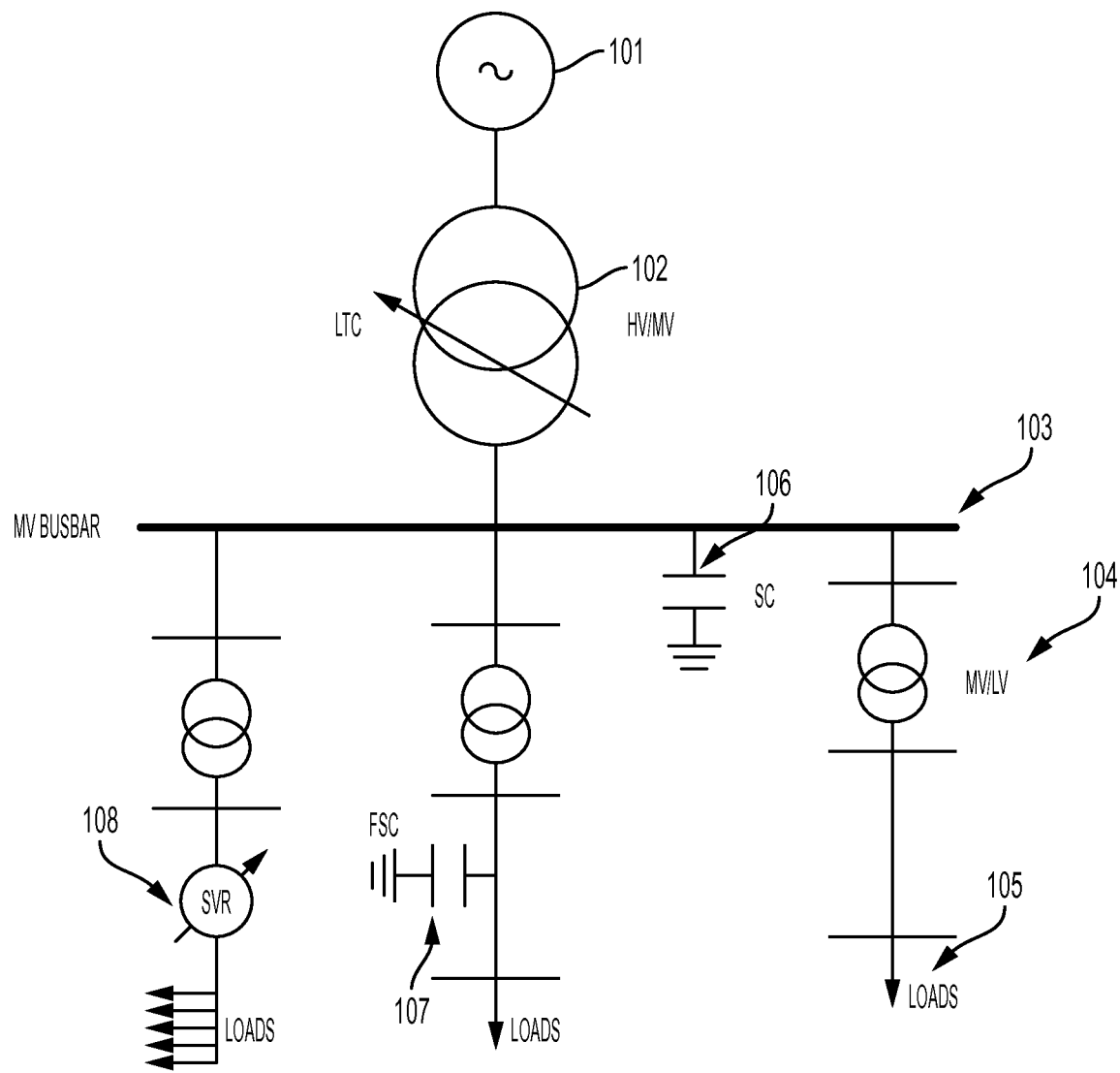
FIG. 1 shows a schematic block diagram illustrating typical Volt/VAR control devices in distribution systems.

To mitigate existing volt/VAR control limitations and facilitate a seamless operation of modern distribution systems, a dynamic optimal volt/VAR control system and method is provided, with the following objectives:
  a. Consider the interaction of the new system elements such as DG units, energy storage devices, electric vehicle chargers, UPFCs DFACTS, and demand response programs, in the DOVVC process.
  b. Minimize the system losses, maximize grid efficiency, improve asset utilization, improve power factor, while limiting the number of volt/VAR device operations and keeping consumer voltage magnitudes within standards
  c. Dynamic model updates and automatic volt/VAR device set-points upon:
     i. Regular time intervals (e.g. hourly)
     ii. Distribution network reconfiguration
     iii. Change in load demand compared to the forecasted load
     iv. Change in generation compared to the forecasted generation
     v. Violation of operational constraints, such as due to bidirectional power flow from DGs (e.g. reverse power flow, load/generation unbalance) or any emergency situation (e.g. feeder fault)
  d. Manage and coordinate multiple objectives and constraints from multiple EPS tiers.

Reference will now be made in detail to the preferred embodiments of the present invention, examples of which are illustrated in the accompanying drawings. The following description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

Reference in this specification to "an embodiment" or "the embodiment" means that a particular feature, structure, or characteristic described in connection with the embodiment is included in at least an embodiment of the disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The present invention is described below with reference to block diagrams and operational illustrations of methods and devices for volt/VAR control in electric power management and automation systems. It is understood that each block of the block diagrams or operational illustrations, and combinations of blocks in the block diagrams or operational illustrations, may be implemented by means of analog or digital hardware and computer program instructions. These computer program instructions may be stored on computer-readable media and provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

The nature of distribution systems is normally dynamic due to changes in their load conditions and more recently, renewable resources generation which brings uncertainty and randomness to power system operations. The VVC problem is one of the most challenging problems in distribution system operation. Previously, there was no general optimization technique to be used by all utilities to find a high-quality solution to satisfy all requirements. For example, exhaustive search is inefficient to meet fast control requirement due to its time consuming calculations. Furthermore, traditional knowledge-based techniques such as expert systems, fuzzy logic, and heuristic rules cannot optimally adjust/update their control decisions due to variation of operational points.

In an embodiment, the presently disclosed system and method can provide a novel and reliable solution to the VVC problem. In order to alleviate the limitations of the previous methods and to provide an efficient and adaptive system operation, the system knowledge together with an online control can be used, as discussed below.

The VVC algorithm search efficiency is improved and sped up when the problem search space is reduced by prior system experience. Offline search for different time frames ahead (i.e., seasonal, weekly, and daily) and/or historical system information can be used from this prior system knowledge.

This knowledge is accumulated in a database and optimized by optimal search.

By finding the different combinations of operation options in advance, the optimal combination that satisfies the desired flexible objectives can be found. For example, the optimal combination can be selected to minimize the operational cost due to: energy losses, generation curtailment, reactive power, ancillary services, load shedding, and energy storage.

In an embodiment, the presently disclosed methods can provide multi-tier multi-stage voltage and reactive power control (VVC) in EPMAS implementation. These methods can be divided into: (1) multi-tier voltage and reactive power control; and (2) multi-stage voltage and reactive power control. These methods are to be embedded in the EPMAS and are described in the following sections.

Multi-tier Voltage and Reactive Power Control

The multi-tier voltage and reactive power control is based on the hierarchal structure of electrical power systems which have multi-tier control with independent system operator (ISO) at the top (Player 1) and assumed to include the independent market operator (IMO), transmission company as the next tier (Player 2) and assumed to include any transmission system operator and regional transmission operator, distribution company as the next (Player 3) and assumed to include any distribution system operator and microgrid operators, and DER owners/operators, nanogrid operators and electricity users/customers (player 4). The proposed multi-tier voltage and reactive power control is performed through these players, where each player contributes based on its control authority and its available energy and information resources/devices/controllers in finding the optimal set-points of control variables according to certain criterion.

In an embodiment, the presently disclosed system and method for the multi-tier voltage and reactive power control consists of several cascaded stages. In the first stage (i.e., player 1), the set-points of control variables are determined to satisfy a criterion ($M_1$) of this specific stage. The outputs of the first stage are the optimal devices/controllers set-points to match this stage. Then, in each stage i, where i={2, 3, 4} for each of the players, the aim is to tune the devices/controllers set-points resulted from the previous stage. The tuning is performed by satisfying the criterion of the current stage while keeping the $M_{i-1}$ from stage i−1 as a hard constraint. This multi-tier control guarantees the full coordination among different levels of control/players to avoid contradiction in objectives. Furthermore, it provides effective way for cross optimization and appropriate use of shared resources for different system applications.

Figure 2:
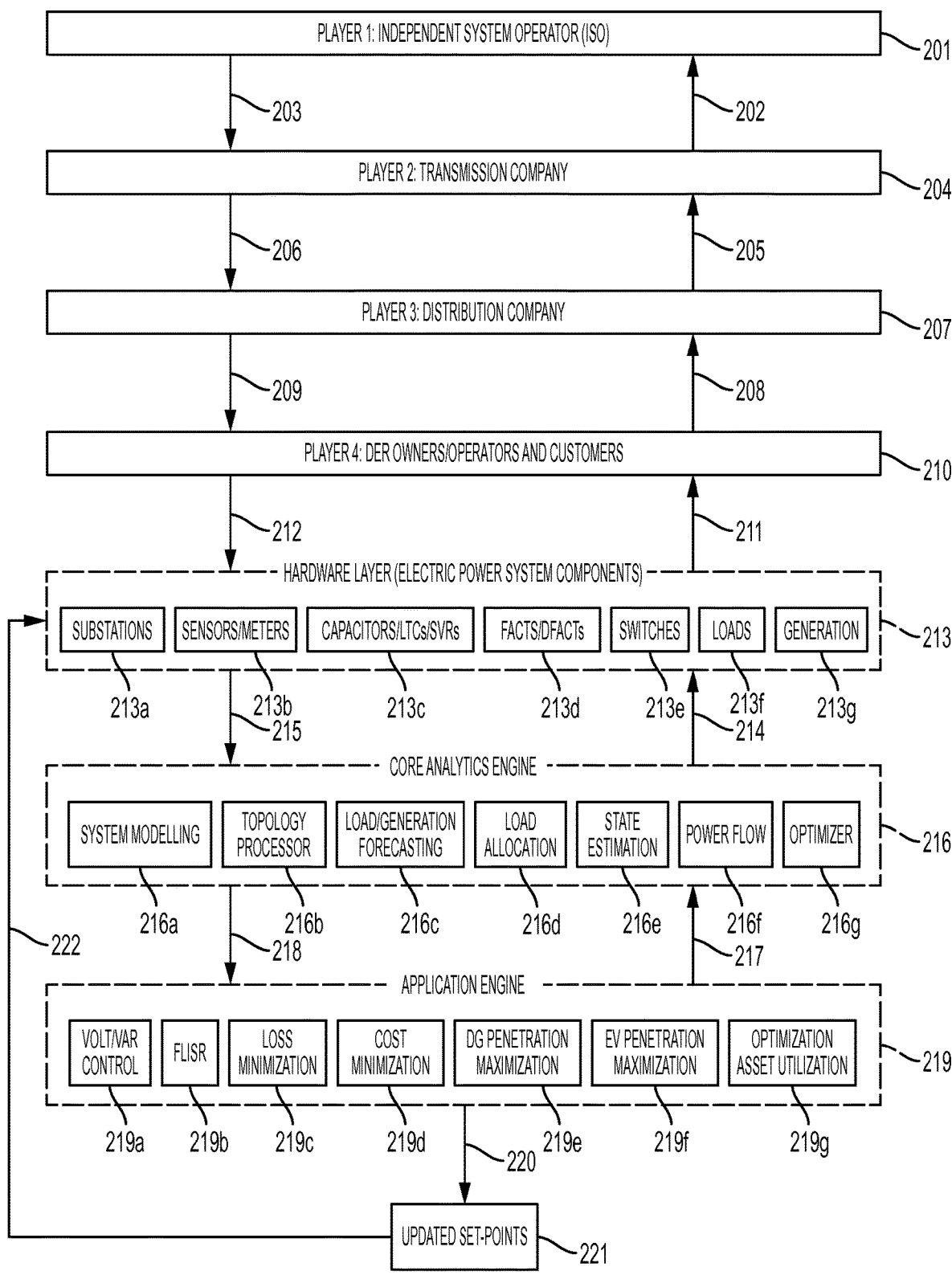
FIG. 2 shows a block diagram illustrating a multi-tier voltage and reactive power control methodology in accordance with an embodiment.

The structure of the multi-tier voltage and reactive power control methodology is illustrated in FIG. 2 and can be explained as follows. With reference to FIG. 2, 201 indicates Player 1 for independent system operators, including independent market operators. 202 indicates Data flow from Player 2 (204) to player 1 (201). 203 indicates a data flow from Player 1 (201) to Player 2 (204). 204 indicates Player 2 for transmission company, including transmission system operators and regional transmission operators. 205 indicates a Data flow from Player 3 (207) to Player 2 (204). 206 indicates a data flow from Player 2 (204) to Player 3 (207). 207 indicates Player 3 for distribution company, including distribution system operators and microgrid operators. 208 indicates a Data flow from player 4 (210) to player 3 (207). 209 indicates a Data flow from Player 3 (207) to Player 4 (210). 210 indicates Player 4 for DER owners/operators, nanogrid operators and electricity users/customers. 211 indicates a data flow from hardware layer (211) to player 4 (210). 212 indicates a data flow from player 4 (210) to hardware layer (211).

In FIG. 2, 213 indicates the hardware layer for electric power system, which has the following components: 213*a* indicates substations; 213*b* indicates sensors and meters; 213*c* indicates capacitors, load tap changers (LTCs), and step voltage regulators (SVRs); 213*d* indicates FACTs and DFACTs; 213*e* indicates switches; 213*f* indicates loads; and 213*g* indicates generation.

With continued reference to FIG. 2, 214 indicates data flow from core analytics engine (216) to hardware layer (213). 215 indicates Data flow from hardware layer (213) to core analytics engine (216). 216 indicates Core analytics engine, which includes the following sub-components: 216*a* indicates system modeling; 216*b* indicates topology processor; 216*c* indicates load and generation forecasting; 216*d* indicates load allocation; 216*e* indicates state estimation; 216*f* indicates power flow; 216*g* indicates an optimizer.

In FIG. 2, 217 indicates data flow from application engine (219) to core analytics engine (216). 218 indicates data flow from core analytics engine (216) to application engine (219). 219 indicates application engine, including the following sub-components: 219*a* indicates volt/VAR control; 219*b* indicates fault location, isolation and service restoration (FLISR); 219*c* indicates loss minimization; 219*d* indicates cost minimization; 219*e* indicates Distributed Generation (DG) penetration maximization; 219*f* indicates Electric Vehicles (EV) penetration maximization; 219*g* indicates optimization asset utilization.

With continued reference to FIG. 2, data flow 220 from application engine (219) to updated set-points or control decisions (221) implemented on the volt/VAR devices can be provided by network adapters associated with various components of the system, including components of the EPMAS and the volt/VAR devices themselves. Other communications channels, such as serial and parallel communications, may be utilized to provide such communications. 221 indicates updated set-points or control decisions. 222 indicates data flow from control decisions (221) to hardware layer (213).

Multi-stage Voltage and Reactive Power Control

In an embodiment, the invention utilizes a multi-stage volt/VAR control algorithm to facilitate the modern distribution system practical implementation. This method can be divided into two types of stages:

Offline stages (Stage 0-2) to determine dispatch schedule based on forecasted load and generation. This useful control knowledge is saved in database memory to facilitate full operating control. Also, their control decisions can be implemented as a backup for online stage in case of its failure.

Online stage (Stage 3) to determine the optimal real time instantaneous operation of VVC devices, based on available knowledge and online search technique. Furthermore, it gradually acquired control knowledge and saved in database memory for further applications.

Figure 3:
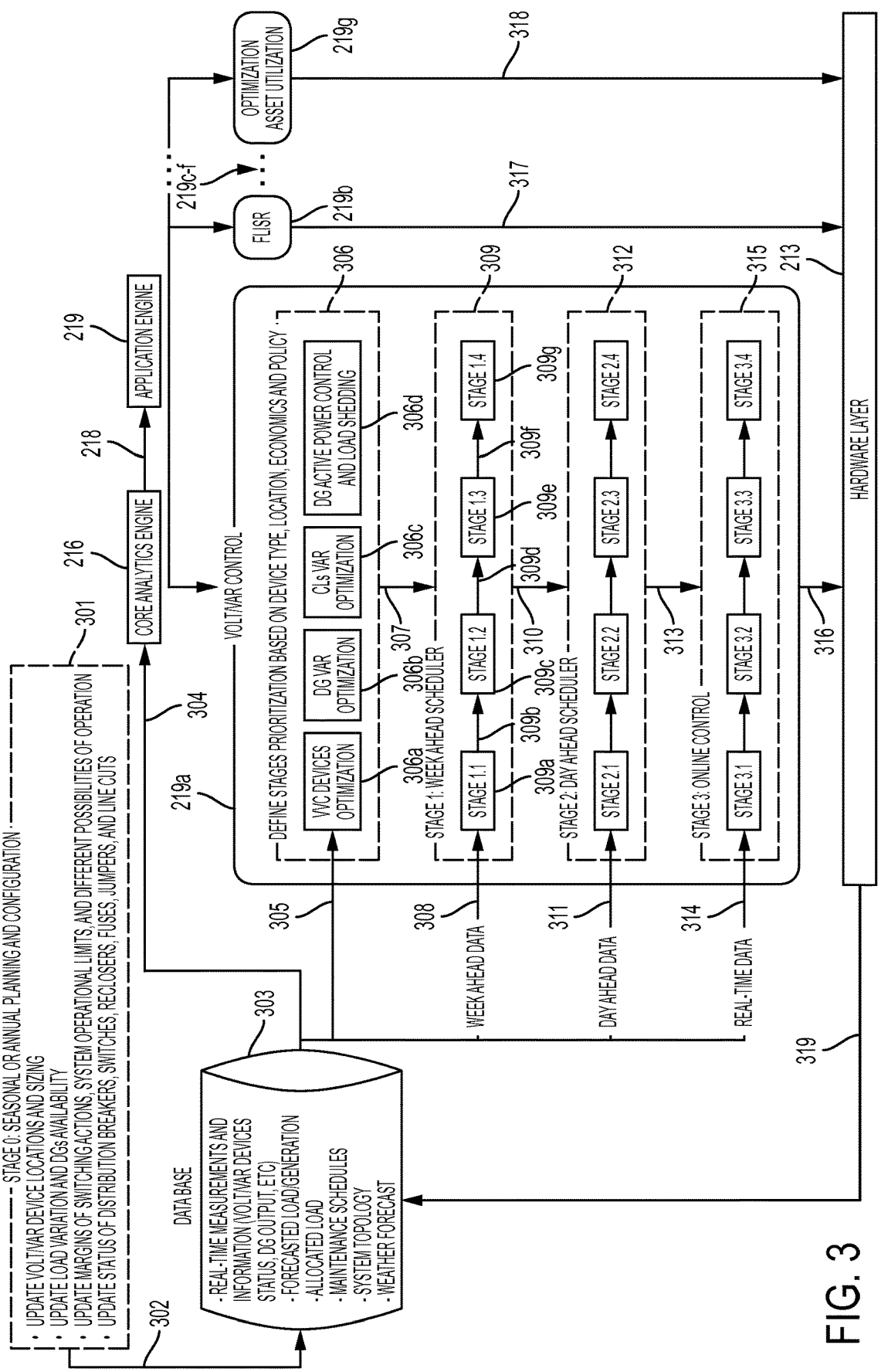
FIG. 3 shows a block diagram illustrating a multi-stage voltage and reactive power control methodology in accordance with an embodiment.

The structure of the multi-stage voltage and reactive power control methodology is illustrated in FIG. 3 and can be explained as follows. 301 indicates stage 0 for seasonal or annual planning and configuration. 302 indicates Control variables and system components status flow from stage 0 (301) to database (303). 303 indicates a database including all system parameters, control variables, forecasted load and generation, allocated load, etc. 304 indicates data flow from database (303) to core analytics engine (216). 305 indicates Data flow from database (303) to define stages prioritization model (306). 306 indicates a user preference model to define stages prioritization based on device type, location, economics and policy. 306*a* indicates VVC devices optimization; 306*b* indicates DG VAR optimization; 306*c* indicates controllable loads (CLs) VAR optimization; 306*d* indicates DG active power control and load shedding.

With continued reference to FIG. 3, 307 indicates Data flow from user preference model to define stages prioritization (306) to stage 1 for week ahead scheduler (309); 308 indicates week ahead data flow from database (303) to stage 1 for week ahead scheduler (309); 309 indicates Stage 1 for week ahead scheduler: 309*a* indicates Stage 1.1 (Highest priority stage); 309*b* indicates data flow from stage 1.1 (309*a*) to stage 1.2 (309*c*); 309*c* indicates Stage 1.2; 309*d* indicates data flow from stage 1.2 (309*c*) to stage 1.3 (309*e*); 309*e* indicates Stage 1.3; 309*f* indicates data flow from stage 1.3 (309*e*) to stage 1.4 (309*g*); and 309*g* indicates Stage 1.4 (Lowest priority stage).

310 indicates data flow from stage 1 for week ahead scheduler (309) to stage 2 for day ahead scheduler (312). 311 indicates day ahead data flow from database (303) to stage 2 for day ahead scheduler (312). 312 indicates Stage 2 for day ahead scheduler. 313 indicates data flow from stage 2 for day ahead scheduler (312) to stage 3 for online control (315). 314 indicates real-time data flow from database (303) to stage 3 for online control (315). 315 indicates stage 3 for online control. 316 indicates data flow from stage 3 (315) to the distribution network (213). 317 indicates data flow from FLISR application (219*b*) to the distribution network (213). 318 indicates data flow from optimization asset utilization application (219*g*) to the distribution network (213). 319 indicates data flow from the distribution network (213) to database (303).

Stage 0 (301): Planning and Configuration

This stage can be applied pre-installation during planning and engineering, or can be performed seasonally and yearly. It aims to configure and plan system operations with respect to volt/VAR device locations and sizing, multi-tier objectives, load variation, DGs availability, margins of switching actions, system operational limits, different possibilities of operation, and status of distribution breakers, switches, reclosers, fuses, jumpers, line cuts, etc.

Stage 1 (309): Week-Ahead Scheduling

To achieve fast and efficient online response, full control knowledge should be readily stored in database and prepared for use. By using the predicted load and generation of renewable-based DGs for week-ahead and other important factors (e.g. historical network data such as historical load profile, DG output power generation, and corresponding implemented volt/VAR devices control decisions), a week-ahead schedule can be planned for the system for all possible future load/generation combinations.

Multiple objectives can be considered from multiple EPS tiers, with offline week-ahead optimization providing the database with a set of optimal tradeoff solutions. Each solution will have a major improvement in one of the objectives and has its unique contribution to meet other objectives. Selecting a proper solution from this set will be flexible and mainly depend on each utility's control preference. For the sake of reliable operation, this stage is considered as a guide for stage 2 as well as a backup in case of failure (e.g. extended loss of communication).

Stage 2 (312): 24 hr Day-ahead Scheduling

In order to realize the full control information and to update the control decisions of stages 0 and 1, the day-ahead scheduler defines the VVC devices set points at each dispatch time interval of the day by using the day-ahead forecasts of electrical loads as well as DG productions. The inputs include multi-tier objectives, electrical load forecasts, forecast of energy supplied by DG units, and constraints (upper and lower limits) relevant to the technical system operation. This stage is considered as a guide for stage 3 as well as a backup in case of failure.

Stage 3 (315): Online Dispatch Control

The operating points may change with time compared to the forecasted ones due to the uncertain and dynamic nature of distribution systems. To follow these changes and to meet the varying control preferences, online dispatch control will be applied. The online control stage processes the real-time distribution system measurements and requests from multiple EPS tiers to determine appropriate volt/VAR control actions and provide closed-loop feedback to accomplish electric utility specified objectives.

To provide an efficient online feasible solution within a limited time interval, the prepared control knowledge from offline stages are included. Therefore, to reflect the distribution network conditions at each dispatch time interval, the day-ahead decisions from Stage 2 are adjusted based on the difference between the measured and forecasted loads. Stage 3 determines whether to follow the control sequence which is assigned by the day-ahead schedule or to run an optimization procedure in order to modify/update the volt/VAR control decisions that were assigned by the day-ahead schedule.

In an embodiment, the online control algorithm can be implemented with four steps or phases. The first is to collect real-time data of the network state in terms of volt/VAR devices set-points and measurement points, and collect the adjusted forecasts of both DG mean production and load requests, from multiple EPS tiers. The second is to run the power flow based on the day-ahead scheduler settings/decisions. Then, if any technical constraint is violated (e.g. the voltages values deviate from the acceptable limits), an optimization procedure starts which modifies the decisions that were assigned by the day-ahead scheduler. Finally, if there is no constraints violation, the day-ahead scheduler optimal decisions are maintained (no corrective action taken).

User Preference Model to Define Stages Prioritization (306)

Four sub-stages are embedded within each Stage X, where X=1, 2, and 3. The four stages aim to find appropriate setting of the volt/VAR devices set-points in order to maintain the voltage profile within the limits and to achieve the desired objectives. The defined stages prioritization is based on device type, location, economics and policy. Thus, the sequence of these four volt/VAR control stages is completely depending on each utility policy, regulations (e.g., the allowed number of switching actions for each device, cost of switching actions, and its evaluation of the expected benefits compared to switching consequences and devices to be used) and the available volt/VAR compensation devices in its distribution network.

The following section gives an example of these stages sequence that focuses on the volt/VAR control capability of different available devices and their contribution in maintaining the voltage profile within the standard limits.

VVC Devices Optimization (306a)

This stage represents the first defense line for volt/VAR control problem. VVC devices such as step voltage regulators, load-tap changing transformers, and switched and fixed capacitor banks aim to keep customer voltages within regulatory bandwidths, free up capacity in the generation, transmission, and distribution systems, and reduce real power losses.

In the market of active distribution networks, FACTS can operate in medium and low voltage levels with major objectives of improving voltage profiles, correcting power factor, and reducing line losses. DFACTS devices offer a flexible and comprehensive solution to voltage profile control in distribution systems. The combination of fixed and switched capacitors may bring variable reactive power, but it falls short to provide the exact requirement. In addition, capacitors with inductive components for solving the overvoltage issues may produce Ferro-resonance. Thus, using DFACTS with the traditional VVC devices (LTC, SVR, SC, and FSC) overcome these limitations and makes the VVC optimization works more efficiently. This is because DFACTS have improved voltage and current handling capabilities. For example, a device such as STATCOM has the ability to provide a solution in fast response time which supports the dynamic voltage control requirement in the system. On the other hand, a device such as static VAR compensator is able to provide voltage control within very tight parameters despite a widely varying load and/or output from DGs.

The optimum settings of VVC devices (e.g. LTC, SVR, SC, FSC, and DFACTS) depend on the following: the spatial distribution of load (where on the feeder, e.g. load allocation); the phase connection of load (which phase); the load characteristics with respect to voltage (constant power, constant current, constant impedance, and percent mix); network topology and parameters; transformer parameters and connection types (delta or wye-connected); and variations of load and/or DG output power.

VVC devices optimization uses bidirectional balanced/unbalanced power flow, load/generation forecast (LGF), load allocation (LA), and system modeling applications to obtain the optimal network state. It estimates sensitivity/gradient factors in order to obtain intermediate solutions in the voltage control iterations. Then, it checks the feasibility of candidate solutions to be implemented. One of the major applications of effective VVC is the implementation of conservation voltage reduction (CVR). CVR provides demand reduction through controlled reduction in operating voltage at customer load points.

The outputs of the VVC devices optimization can include the optimal voltage regulator tap settings, on-load tap changer (OLTC) tap settings, capacitor banks switching, and DFACTS settings. These optimal settings are sent to their corresponding local controllers to be implemented in order to accomplish the desired objectives.

DG VAR Optimization (306b)

The connection of a DG unit modifies the voltage profile on distribution feeders due to their injected active and/or reactive power in the distribution network. Usually voltage increases at DG connection points and on the entire feeder. Furthermore, DGs connection effects on distribution feeders' voltage profile can be summarized as follows: DG connection may cause overvoltage during minimum load times; DGs may un-optimise (i.e. cause improper decisions) VVC devices settings, especially when DGs are not allocated homogeneously among different feeders; and, with high DG penetration, excessive wear and tear for VVC devices, unaccepted voltage fluctuations, voltage unbalance and change in the system losses are expected.

The operating mode of each DG unit can furthermore have one of two states, normal state or disturbed state. In the normal state, there the voltage is located inside the desired operating band such as voltage (i.e. $V_{min} \leq V \leq V_{max}$), frequency, and unbalance. In this case, DG operates in P/Q mode where DGs inject fixed active power based on their rating.

In the disturbed state, where voltage violates the desired operating limits (e.g. $V<V_{min}$ or $V>V_{max}$). In this case, the goal of each DG controller is to maintain the operating point inside the desired operating band. DG can then operate in voltage regulation mode (AVR for synchronous machines and P/V mode for inverter based DGs), and only reactive power is used to control voltage at DG point of common coupling (PCC). This stage includes consideration of all VVC elements in the previous stage as well as the DG voltage set points that bring the system voltage profile within the desired limits. In this case, the DG technical limits play an important role in their contributions to the voltage control problem. The contribution of each DG depends on its reactive power limitation ($Q_{min}$ and $Q_{max}$). Hence, if it cannot return the desired voltage range within its reactive power limitation, the voltage may change to reach a critical state.

Thus, an upgrading for the conventional voltage and reactive power control techniques from their passive form to an active control is desireable. DG VAR optimization stage refers to actions that are needed to bring the system under satisfactory limits because VVC devices optimization stage actions are insufficient. DG VAR optimization stage provides the participation of DGs in voltage control.

Controllable Loads (CLs) VAR Optimization (306c)

CLs VAR optimization stage refers to actions that are needed to bring the system under satisfactory limits because stages 306a and 306b actions are insufficient. Stage 306c provides the participation of controllable loads in voltage control through controlling their reactive power requirements. Stage 306c includes consideration of VVC devices (Stage 306a) and DG VAR (Stage 306b).

Because loads are distributed throughout the grid, their level of spatial and temporal flexibility allows them to respond instantaneously to contingencies. The main concept of demand response is based on controlling those loads in an active manner. For example, electric vehicles (EVs) are emerging as controllable loads which their time of charging could be controlled. Thus, they can have a significant impact on power demand shaping. Each EV requires a charger in order to connect the vehicle to grid. The charger AC/DC converter is capable of adjusting its reactive power in a specified range. These chargers are always connected to the grid and their reactive power capability (injected or absorbed reactive power) depends on: the actual active power transfer of the AC/DC converter; the nominal kVA rating of the converter; the voltage at the point of common coupling; converter dc link voltage; and interfacing reactance, which includes the interfacing transformer and the filter equivalent reactance.

Thus, when the EV is connected to the distribution network through the converter for charging, its reactive power can be reduced to a small amount. Furthermore, at contingencies, the AC/DC converter can support the grid with its reactive power.

DG Active Power Control and Load Shedding (306d)

This stage represents the last defense line for volt/VAR control problem. Stage 306d refers to urgent actions that are needed to bring the system under satisfactory limits because stages 306a, 306b and 306c actions are insufficient. For example, the DG and CLs cannot act any more by compensation of reactive power to bring the voltage within the admissible limits. Thus, regulation of active power becomes compulsory.

Stage 306d includes active power regulation actions in addition to the control actions in Stage 306c. The active power regulation actions can include load shedding, system reconfiguration (i.e., transferring section with some load points from the overloaded/undervoltage feeder to other neighboring feeders), and/or DG generation increase (i.e., in case for severe undervoltages) or DG generation curtailment (i.e., in case for high overvoltage's) for consumers and/or DG owners who have agreements with their utilities to be subjected to those emergency actions.

The various embodiments of the invention described above can also be applied where advanced meter infrastructure (AMI) and two-way communication are implemented everywhere in electrical power distribution systems under the concept of smart grid. For buses that have installed meters, the load and voltage profiles will be treated as known load and voltage values. The load profile can be forecasted with better accuracy which will allow the load allocation and thus volt/VAR control to improve the overall performance of the system operation. Furthermore, the two-way communication will facilitate the application of distributed control and parallel processing. In addition, communication and real-time data will enable efficient coordination among devices and will allow to take the market information on energy trades and prices into consideration.

Thus, the invention as described above can provide a dynamic (auto-adaptive) optimal VVC (DOVVC) for modern electric power systems. In various embodiments, the advanced DOVVC scheme can enhance overall efficiency via reducing the system losses. The described system can also reduce energy demand via applying conservation voltage reduction (CVR), in which the load powers are reduced through optimal reduction in the customer operating voltages. The systems and method can improve the voltage profile under variable generation, storage, and demand conditions. The systems and methods described can also improve utilization of system assets, enable increased DG penetration by enhancing voltage and current profiles, improve power quality such as power factors, and coordinate objectives and constraints between multiple tiers of EPS operations.

In various embodiments, the invention can provide novel systems and methods for volt/VAR control that are multi-stage, in that they provide voltage and reactive power control through several stages in the time dimension. Such systems and methods can also provide volt/VAR control that is multi-tier in that voltage and reactive power control are performed on several tiers in control authority/players dimension. These systems and methods can also be configured to accommodate all resources, i.e., to include all available devices and field information from monitors, controllers, intelligent electronic devices, installed at different system components. Such components include meters, sensors, capacitor banks, battery energy storage systems, distributed generation units, electric vehicles chargers, switches, and substations.

In various embodiments, the invention can provide novel systems and methods for volt/VAR control that are distributed in that they support parallel processing, and can be centralized at one controller or decentralized across multiple controllers. The systems and methods described above, in various embodiments, can be configured with adjustable settings to meet the requirements of a large variety of node types and system configurations. These systems can further be dynamic in that they can adjust their operations based on real-time measurements and power system operating conditions. Such systems can be configured to provide flexibility according to different control preferences, and can be applied to any distribution system to provide coordination among all volt/VAR devices, DFACTS, DGs and controllable loads.

At least some aspects disclosed can be embodied, at least in part, in software. That is, the techniques may be carried out in a special purpose or general purpose computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, firmware, ROM, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A non-transient machine-readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer-to-peer networks. Different portions of the data and instructions can be obtained from different centralized servers and/or peer-to-peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine-readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others.

In general, a machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The above embodiments and preferences are illustrative of the present invention. It is neither necessary, nor intended for this patent to outline or define every possible combination or embodiment. The inventor has disclosed sufficient information to permit one skilled in the art to practice at least one embodiment of the invention. The above description and drawings are merely illustrative of the present invention and that changes in components, structure and procedure are possible without departing from the scope of the present invention as defined in the following claims. For example, elements and/or steps described above and/or in the following claims in a particular order may be practiced in a different order without departing from the invention. Thus, while the invention has been particularly shown and described with reference to embodiments thereof, it will be understood by those skilled in the art that various changes in form and details may be made therein without departing from the spirit and scope of the invention.

What is claimed is:

1. A multi-stage dynamic auto-adaptive volt/VAR control, comprising:
    memory storing program code;
    a communications channel operatively connected to a volt/VAR device;
    a processor configured to:
        access a database of prior system knowledge;
        receive real-time measurements and power system operating condition information;
        process the prior system knowledge and the real time measurements and power system operating condition information to create a set of commands for voltage and reactive power control, the set of commands causing the volt/VAR device to (a) maintain a voltage profile at the volt/VAR device within predefined limits, or (b) reduce electrical losses through voltage optimization;
        cause the set of commands to be sent to the volt/VAR device through a plurality of cascaded stages in the time dimension, the plurality of cascaded stages in the time dimension comprising at least a first stage and a second stage, the second stage being configured to tune set points resulting from the first stage.

2. The volt/VAR control according to claim 1, wherein the commands comprise updated set points.

3. The volt/VAR control according to claim 1, wherein the commands comprise control decisions.

4. The volt/VAR control according to claim 1, wherein the volt/VAR device comprises a voltage regulator.

5. The volt/VAR control according to claim 1, wherein the volt/VAR device comprises a load tap changer.

6. The volt/VAR control according to claim 1, wherein the volt/VAR device comprises a primary or secondary capacitor bank.

7. The volt/VAR control according to claim 1, wherein the volt/VAR device comprises a distribution flexible AC transmission system.

8. The volt/VAR control according to claim 1, wherein the volt/VAR device comprises a unified power flow control.

9. The volt/VAR control according to claim 1, wherein the volt/VAR device comprises an energy storage system.

10. The volt/VAR control according to claim 9, wherein the volt/VAR device comprises a switched capacitor bank.

11. The volt/VAR control according to claim 1, wherein the volt/VAR device comprises a smart inverter.

12. The volt/VAR control according to claim 1, wherein the volt/VAR device comprises a device having with real and reactive power controls.

13. The volt/VAR control according to claim 1, wherein the control is configured to support parallel processing in a manner whereby it can be centralized at one controller or decentralized across multiple controllers.

14. The volt/VAR control according to claim 1, wherein the volt/VAR device comprises a plurality of volt/VAR devices.

15. A multi-tiered dynamic auto-adaptive volt/VAR control, comprising:
    memory storing program code;
    a communications channel operatively connected to a volt/VAR device;
    a processor configured to:
        access a database of prior system knowledge;
        receive real-time measurements and power system operating condition information;
        process the prior system knowledge and the real time measurements and power system operating condition information to create a set of commands for voltage and reactive power control, the set of commands causing the volt/VAR device to maintain a voltage profile at the volt/VAR device within predefined limits, or (b) reduce electrical losses through voltage optimization;
        cause the set of commands to be sent to the volt/VAR device through a plurality of tiers of a hierarchical electrical power system, each of the plurality of tiers of the hierarchical electrical power system comprising hardware controlled by a different grid operator, and through a plurality of cascaded stages in the time dimension, the plurality of cascaded stages in the time dimension comprising at least a first stage and a second stage, the second stage being configured to tune set points resulting from the first stage.

16. A distributed dynamic auto-adaptive volt/VAR control, comprising:

memory storing program code;

a communications channel operatively connected to a volt/VAR device;

a processor configured to support parallel processing in a manner whereby like functions of the processor can be centralized at one controller and can be decentralized across multiple controllers, the processor being further configured to:

access a database of prior system knowledge;

receive real-time measurements and power system operating condition information;

process the prior system knowledge and the real time measurements and power system operating condition information to create a set of commands for voltage and reactive power control, the set of commands causing the volt/VAR device to (a) maintain a voltage profile at the volt/VAR device within predefined limits, or (b) reduce electrical losses through voltage optimization; and cause the set of commands to be sent to the volt/VAR device through a plurality of cascaded stages in the time dimension, the plurality of cascaded stages in the time dimension comprising at least a first stage and a second stage, the second stage being configured to tune set points resulting from the first stage.

* * * * *